Patented Sept. 27, 1932

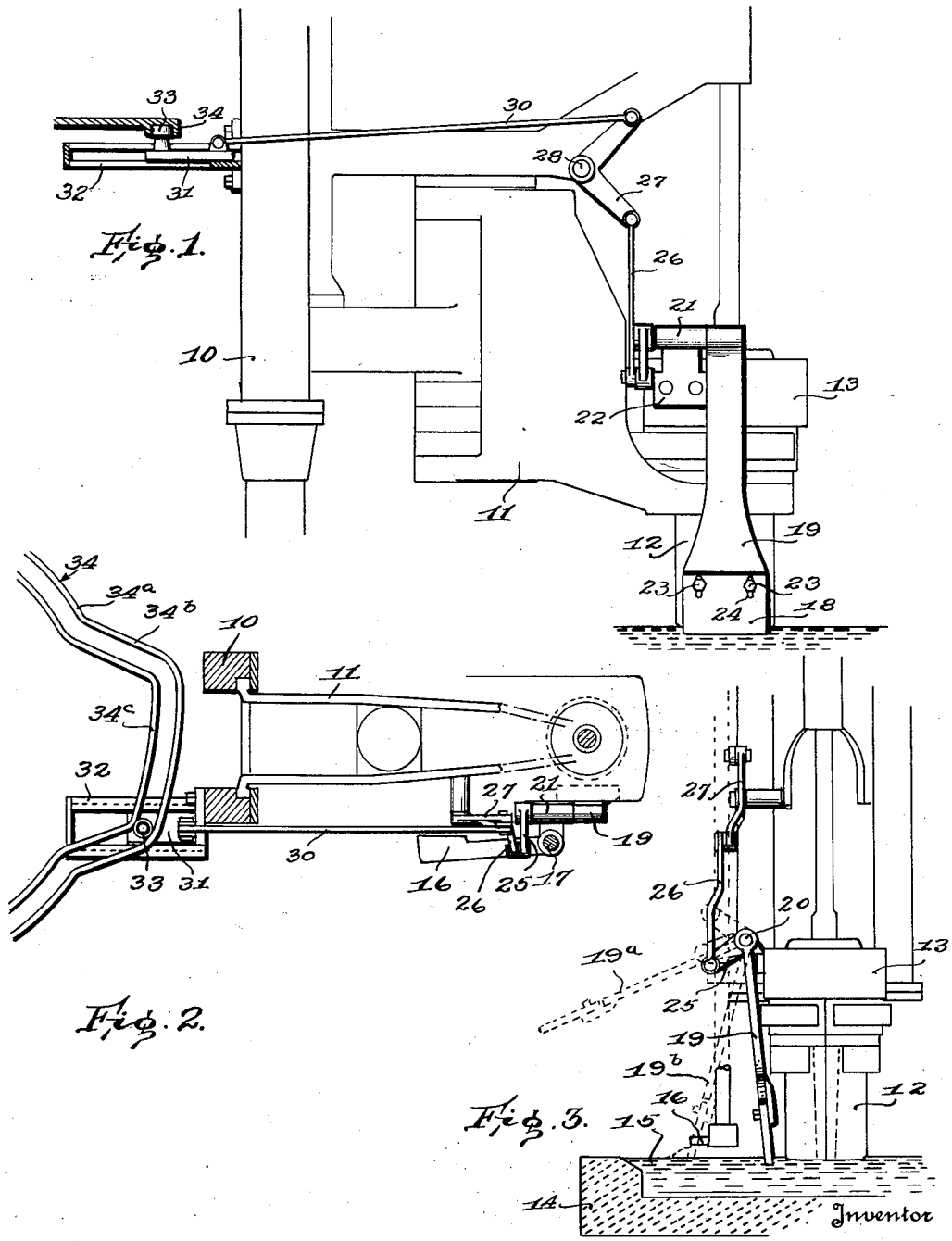

1,879,711

UNITED STATES PATENT OFFICE

JOHN F. RULE, OF TOLEDO, OHIO, ASSIGNOR TO OWENS-ILLINOIS GLASS COMPANY, A CORPORATION OF OHIO

MECHANISM FOR SKIMMING AND STIRRING GLASS

Application filed August 30, 1930. Serial No. 478,849.

My invention relates to glass skimming and stirring apparatus for use with or as forming part of machines for molding glass articles, and particularly machines comprising a mold or molds which are periodically brought into operative relation to a supply body of molten glass and gather the glass by suction. When the mold or molds dip into the glass at frequent intervals, portions of the glass become chilled by contact with the mold and the usual cut-off knife, and there is also a certain amount of chilling on account of exposure to the outside air. It is, therefore, necessary, to maintain a movement or circulation of the glass past the gathering area so that chilled portions are carried back into the furnace where they can be reheated and reassimilated while a fresh supply of glass at a suitable temperature is continuously provided at the gathering point.

An object of the present invention is to provide a simple and practical mechanism by which the desired movement of the glass may be maintained.

A further object of the invention is to provide means which will cause an adequate circulation of glass in a stationary container such as a forebay or extension of a glass furnace, and thereby dispense with the usual rotating pot.

The invention in its preferred form comprises a glass skimming and stirring device which is mounted on the usual traveling mold carriage of a glass blowing machine and dips in the glass in advance of the mold, means being provided to move the stirring device relative to the mold in a forward direction as said device and mold move through the glass. The stirring device thus operates to produce an adequate movement of the glass and to skim off the surface layers in advance of the traveling mold so that chilled portions are removed and forced back into the main tank for remelting while homogeneous glass at a suitable working temperature is presented to the mold.

Other objects of the invention will appear hereinafter.

In the accompanying drawing:

Fig. 1 is a side elevation view, partly diagrammatic, of part of a suction type of glass blowing machine with the present invention applied thereto.

Fig. 2 is a sectional plan view of the same.

Fig. 3 is a front elevation of the mechanism shown in Fig. 1.

The glass forming machine, which may be of conventional or standard construction, comprises a mold carriage 10 which may rotate continuously about a central vertical axis and on which are mounted a series of dip head frames or units 11, each of which carries a suction gathering mold 12 and a blowing head 13 through which vacuum and air are supplied to the mold in the usual manner for gathering the glass and forming it in the molds. As the mold carriage rotates, the molds 12 are brought in succession over a container 14 in which a supply body of molten glass 15 is continuously maintained. The container 14 may be a forebay or extension of the usual melting and refining tank. The frame 11 is mounted for up and down movement in guides on the mold carriage for lifting and lowering the mold, under the control of a stationary cam so designed that as the mold is brought over the supply body of glass it is lowered into contact with the glass. The air is then exhausted from the mold as it travels through the glass. The mold is then lifted above the level of the glass and a knife 16 is swung across the bottom of the mold to sever the glass. The knife is mounted on a vertical rock shaft 17.

The present invention provides a glass skimming and circulating paddle or device 18 mounted on a vertically disposed rock arm 19 fixed at its upper end to a rock shaft 20 mounted to rock in a bearing 21 formed on a plate 22 which may be attached to the head 13. The paddle 18 is attached to the arm 19 by means of bolts 23, the paddle being provided with vertical slots 24 to receive the bolts. This construction permits the paddle to be adjusted vertically so as to project downward below the surface of the glass to any desired depth. The paddle or stirring plate 18 may be quickly removed and replaced by another plate of the same or other design, as conditions may call for.

Fixed to the rock shaft 20 is a rock arm 25 connected through a link 26 to one arm of a bell crank lever 27 fulcrumed at 28 on the frame 11. The other arm of the bell crank is connected through a rod 30 to a slide plate 31 mounted to reciprocate in guideways 32 on the mold carriage. The plate 31 carries a roll 33 which runs on a stationary cam 34.

The cam is so designed that the paddle arm 19 is held up in the dotted line position 19$^a$ (Fig. 3) except while the mold and its paddle are over the container or pot 14. This position is maintained by the dwell portion 34$^a$ of the cam. As the mold approaches the gathering pot, the cam roll runs into and through the cam section 34$^b$, thereby lowering the arm 19 to the full line position (Fig. 3) in which it is approximately vertical and just in advance of the mold. The mold is now lowered to contact with the glass and at the same time the paddle 18 dips into the glass in front of the advancing mold. The cam roll 33 then travels through the cam section 34$^c$ while the mold and paddle are moving across the gathering area. The cam section 34$^c$ is so designed that it moves the cam roll inward toward the center of the machine and thereby operates to swing the paddle arm to the intermediate position 19$^b$ (Fig. 3). This swinging movement is in addition to the bodily movement of the paddle with the mold. It will thus be seen that as the mold traverses the gathering area, the paddle is moved through the glass in front of the mold and at a considerably higher rate of speed. This movement of the paddle serves to skim the surface layers of glass away from the mold and removes portions which have been chilled by preceding mold gathering operations, so that a fresh supply of glass of a uniform high temperature is presented to the mold. The comparatively rapid movement of the paddle through the glass also operates effectively to cause an adequate movement or circulation of glass across the gathering area and causes the chilled portions of glass to be forced back into the main furnace or tank for reheating.

Although I have shown a paddle mounted to oscillate in front of the advancing mold, the invention contemplates other forms of glass skimming and circulating devices which may be mounted to travel with the mold and which may have an additional movement relative to the mold, by which they are rendered more effective. Moreover, desirable results may be obtained with the stirring device in different locations with respect to the mold, although there is an important advantage obtained by having the paddle move in advance of the mold and at a higher rate of speed.

Various modifications may be resorted to within the spirit and scope of my invention.

What I claim is:

1. The combination with a mold and means for causing it to traverse a bath of molten glass, of a stirring device traveling with the mold and positioned to engage the glass in advance of the mold, and means for moving said stirring device relatively to the mold in the direction in which the mold is traveling and thereby causing it to advance through the glass at a higher speed than the mold.

2. The combination with a container for molten glass, of a mold, a traveling support on which the mold is mounted to traverse the glass, a paddle mounted on said support to travel therewith, and means for moving said paddle relative to the support in the general direction of its travel therewith while the mold is traversing the glass and thereby causing the paddle to move through the glass at a higher speed than the mold.

3. The combination of a traveling mold carriage, a mold thereon, a paddle mounted on the mold carriage in advance of the mold, and means to swing said paddle on the mold carriage in the general direction of travel of the mold.

4. The combination of a traveling mold carriage, a mold thereon, a paddle mounted to swing about a horizontal pivot on the mold carriage, said pivot extending transversely to its direction of travel with the mold carriage, a stationary cam, and operating connections between the cam and paddle by which the movement of the mold carriage causes swinging movement of the paddle about said pivot in the general direction of movement of said pivot with the mold carriage.

5. The combination of a traveling mold carriage, a mold thereon, a paddle pivotally mounted on the mold carriage and extending downward from its pivot in advance of the mold, said pivot extending transversely of its direction of travel with the mold carriage, a stationary cam, and operating connections between the cam and said paddle by which the paddle is oscillated about its said pivot in the general direction of travel of the mold.

6. The combination with a container for a pool of molten glass, of a traveling mold carriage, a mold mounted to travel therewith, a paddle pivotally mounted on the mold carriage to swing about a pivot extending transversely to its direction of travel with the mold carriage, said paddle projecting downward adjacent the mold in advance thereof, a stationary cam, and operating connections between the cam and said paddle by which the latter is swung away from the mold in the direction in which the mold is traveling while the mold and paddle are traversing the pool of glass.

7. The combination with a container for a pool of molten glass, of a traveling mold carriage, a mold mounted to travel therewith, a paddle pivotally mounted on the mold carriage to swing about a pivot extending transversely to its direction of travel with the mold carriage, said paddle projecting downward adjacent the mold in advance thereof, a stationary cam, and operating connections between the cam and said paddle by which the latter is swung away from the mold in the direction in which the mold is traveling while the mold and paddle are traversing the pool of glass, whereby the paddle is moved through the glass at a higher speed than the mold, said cam being designed to swing the paddle upward into position to clear the mold and permit the latter to be opened after the glass has passed beyond said container.

8. The combination of a container for a pool of molten glass, a traveling mold carriage, a mold thereon caused to traverse the glass, a glass stirring device mounted on the mold carriage and projecting downward into the glass in front of the mold, and means for imparting to said device a forward movement relative to the mold in the general direction in which the mold is traveling.

9. The combination of a traveling mold carriage, a mold thereon, a paddle pivotally supported on the mold carriage in advance of the mold for swinging movement about an axis extending transversely to the direction of travel of said axis with the mold carriage, and means for swinging the paddle about said axis in the general direction of travel of the mold while traveling with the mold carriage.

Signed at Toledo, Ohio, this 29th day of August, 1930.

JOHN F. RULE.